United States Patent
Hsu et al.

(10) Patent No.: US 11,367,178 B2
(45) Date of Patent: Jun. 21, 2022

(54) METHOD FOR RECONSTRUCTING AN IMAGE

(71) Applicant: V5 TECHNOLOGIES CO., LTD., Hsinchu (TW)

(72) Inventors: Sheng-Chih Hsu, Hsinchu (TW); Chien-Ting Chen, Hsinchu (TW)

(73) Assignee: V5 TECHNOLOGIES CO., LTD., Hsinchu (TW)

( * ) Notice: Subject to any disclaimer, the term of this patent is extended or adjusted under 35 U.S.C. 154(b) by 68 days.

(21) Appl. No.: 17/125,301

(22) Filed: Dec. 17, 2020

(65) Prior Publication Data
US 2022/0044377 A1 Feb. 10, 2022

(30) Foreign Application Priority Data
Aug. 4, 2020 (TW) ................................ 109126348

(51) Int. Cl.
| | |
|---|---|
| G06K 9/00 | (2022.01) |
| G06T 7/00 | (2017.01) |
| G01N 21/95 | (2006.01) |
| G06T 7/50 | (2017.01) |

(52) U.S. Cl.
CPC ......... *G06T 7/001* (2013.01); *G01N 21/9503* (2013.01); *G06T 7/50* (2017.01); *G06T 2207/30148* (2013.01)

(58) Field of Classification Search
CPC . G06T 7/001; G06T 7/50; G06T 2207/30148; G06T 3/0056; G06T 7/149; G06T 7/13; G01N 21/9503
See application file for complete search history.

(56) References Cited

U.S. PATENT DOCUMENTS

| | | | |
|---|---|---|---|
| 2010/0225659 A1* | 9/2010 | Miyazaki | G06F 3/0485 345/564 |
| 2017/0109896 A1* | 4/2017 | Park | G06T 7/12 |
| 2020/0125692 A1* | 4/2020 | Huang | G06F 30/392 |
| 2021/0398246 A1* | 12/2021 | Hsu | G06T 11/00 |

* cited by examiner

*Primary Examiner* — Samir A Ahmed
(74) *Attorney, Agent, or Firm* — Muncy, Geissler, Olds & Lowe, P.C.

(57) ABSTRACT

A method for constructing an image includes: defining a foreground area associated with an object in an original image; identifying a plurality of contour points defining a contour of the object; for each of the contour points, obtaining a reference contour point set that includes at least one reference contour point on each of two sides of the contour point; obtaining a plurality of characteristic lines, each associated with the reference contour point set and defined by an end point obtained from the contour points; and aligning the end points on one side to form a straight edge and making the characteristic lines adjoin each other side by side, so as to construct a reconstructed image.

11 Claims, 11 Drawing Sheets

METHOD FOR RECONSTRUCTING AN IMAGE

CROSS-REFERENCE TO RELATED APPLICATION

This application claims priority of Taiwanese Patent Application No. 109126348, filed on Aug. 4, 2020.

FIELD

The disclosure relates to a method for reconstructing an image.

BACKGROUND

Conventionally, a digital image with a relatively large size (e.g., a digital image of a semiconductor wafer) may be difficult to inspect, due to limitations in displaying. For example, in inspecting the digital image for defects on the semiconductor wafer on a display screen with a relatively smaller size, an inspector may frequently need to manually drag the digital image in two directions (i.e., up-down direction and left-right direction) so as to be able to see all parts of the digital image.

SUMMARY

One object of the disclosure is to provide a method that can alleviate at least one of the drawbacks of the prior art.

According to the disclosure, the method for constructing an image is implemented using a processor of an electronic device and includes:
    obtaining an original image;
    defining a foreground area that is associated with an object in the original image;
    identifying a plurality of contour points that define a contour of the object;
    for each of the plurality of contour points, obtaining a reference contour point set that includes, on each of two sides of the contour points, at least one reference contour point which is another one of the plurality of contour points;
    obtaining a plurality of characteristic lines, each of the characteristic lines being defined by an end point obtained from the contour points, is associated with the corresponding reference contour point set, and has a pre-defined length and a predetermined width;
    obtaining, for each of the characteristic lines, a plurality of pixel value sets that correspond respectively with the a plurality of pixels on the original image that constitute the characteristic line; and
    rearranging the characteristic lines by aligning the end points on one side to form a straight edge and making the characteristic lines adjoin each other side by side, so as to construct a reconstructed image.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
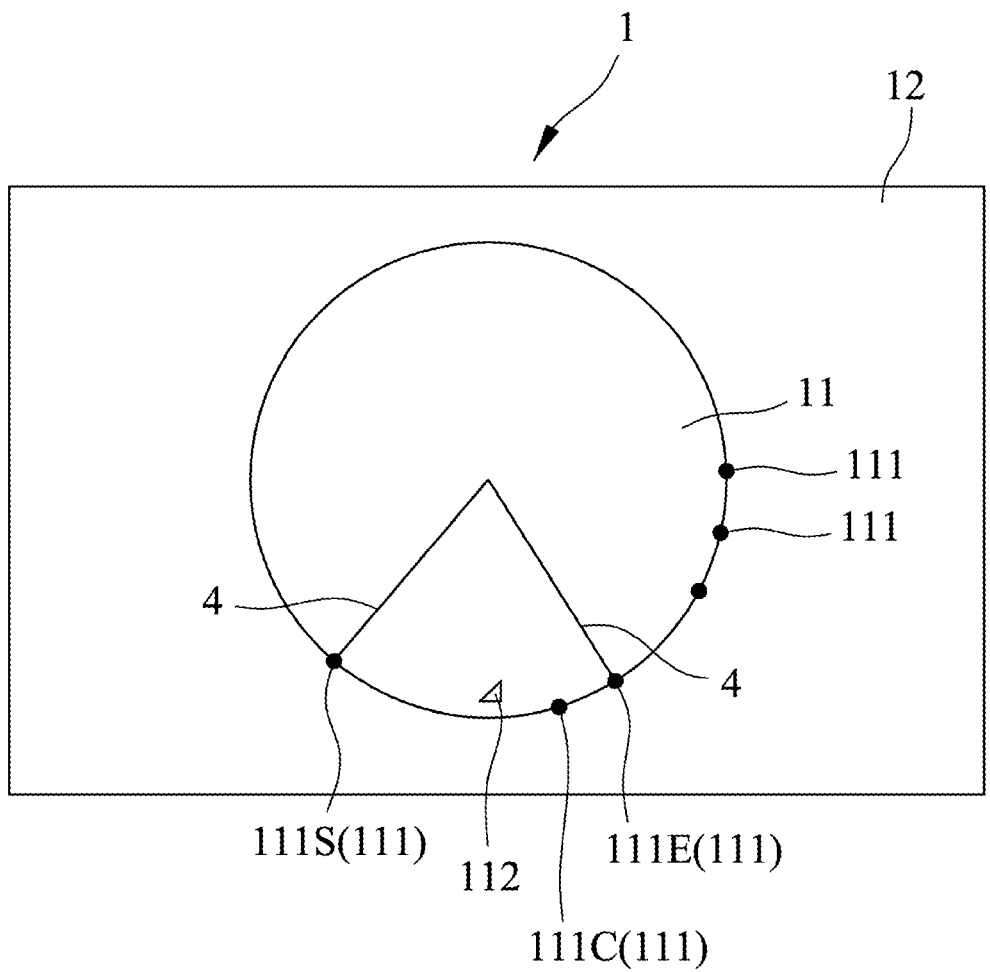
FIG. 1 is a schematic diagram illustrating an original image that contains a circular object and that is being processed according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" may refer to a direct connection among a plurality of electrical apparatus/devices/equipments via an electrically conductive material (e.g., an electrical wire), or an indirect connection between two electrical apparatus/devices/equipments via another one or more apparatus/device/equipment, or wireless communication.

FIG. 1 is a schematic diagram illustrating an original image 1 according to one embodiment of the disclosure. In this embodiment, the original image 1 includes a captured object which substantially has a circular shape and which may be an image of a semiconductor wafer.

Figure 2:
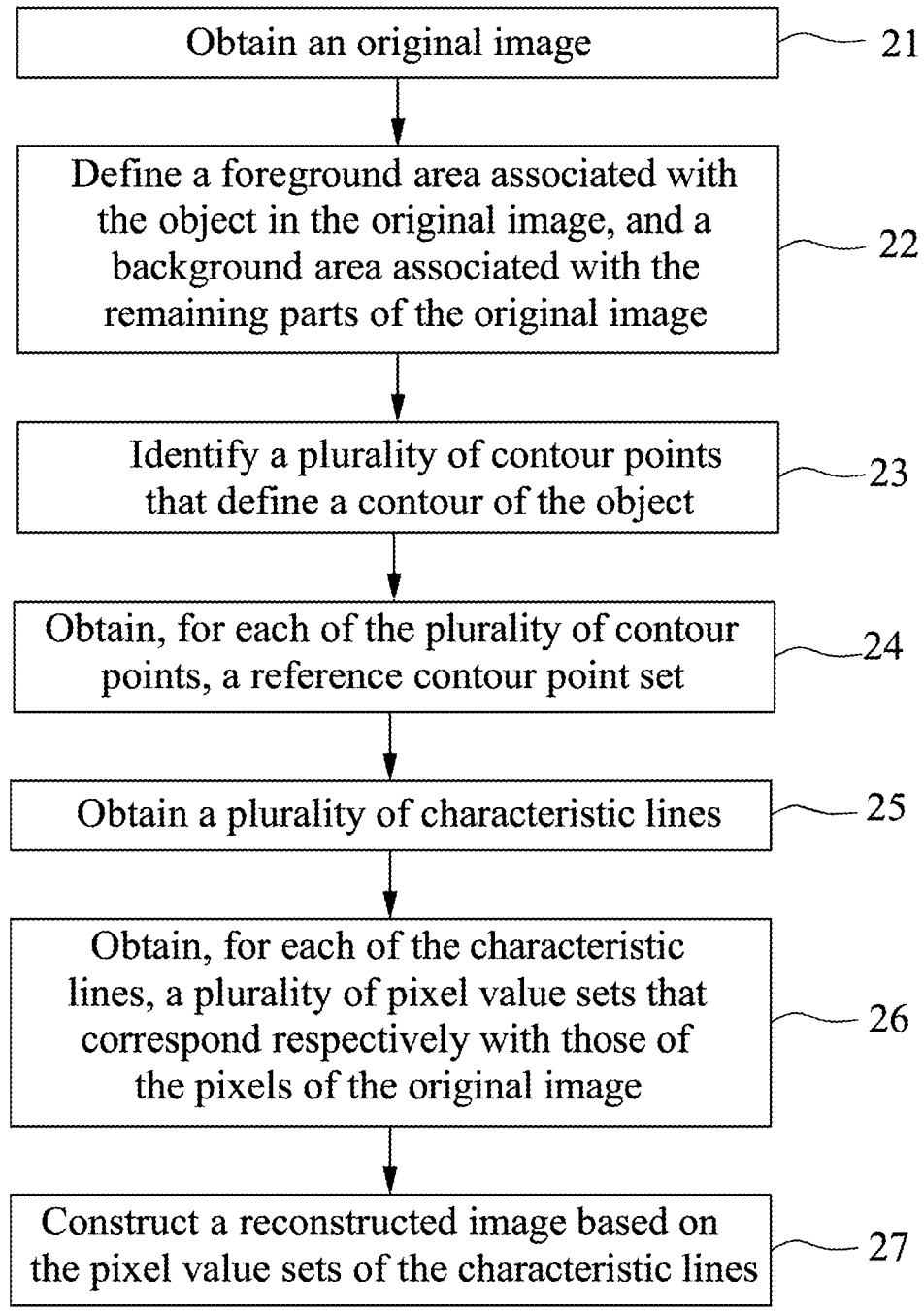
FIG. 2 is a flow chart illustrating steps of a method for reconstructing the original image according to one embodiment of the disclosure.

FIG. 2 is a flow chart illustrating steps of a method for reconstructing an original image to obtain a reconstructed image, according to one embodiment of the disclosure. In this embodiment, the method is implemented by a processor of an electronic device.

Figure 13:
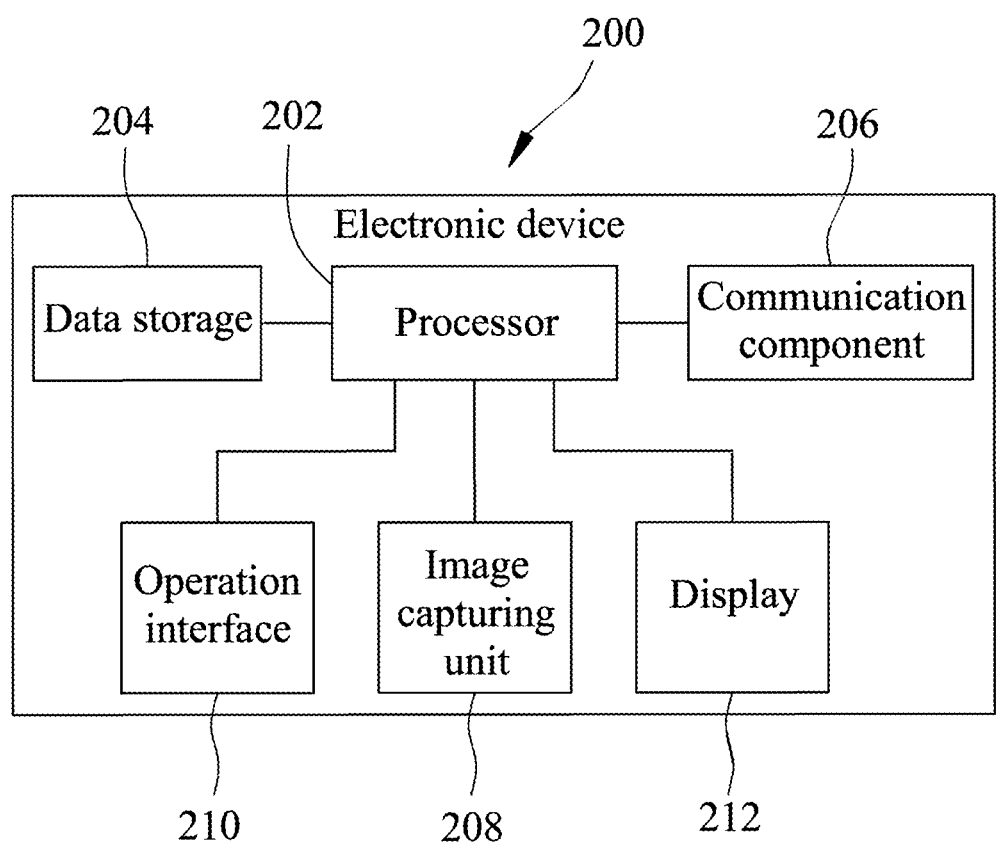
FIG. 13 is a block diagram illustrating an exemplary electronic device for implementing the method according to one embodiment of the disclosure.

FIG. 13 is a block diagram illustrating an exemplary electronic device 200 configured to implement the method for reconstructing the original image 1 according to one embodiment of the disclosure. In this embodiment, the electronic device 200 may be embodied using a personal computer (PC), a laptop, a tablet, a mobile device (e.g., a smartphone), or the like.

The electronic device 200 includes a processor 202, data storage 204, a communication component 206, an image capturing unit 208, an operation interface 210 and a display 212.

The processor 202 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The data storage 204 is coupled to the processor 202, and may be embodied using random access memory (RAM), read only memory (ROM), programmable ROM (PROM), firmware, flash memory, etc.; or any combination thereof. The data storage 204 stores instructions that, when executed by the processor 202, cause the processor 202 to perform the operations as depicted in FIG. 2.

The communication component 206 is coupled to the processor 202, and may include at least one of a radio-frequency integrated circuit (RFIC), a short-range wireless communication module supporting a short-range wireless communication network using a wireless technology of Bluetooth® and/or Wi-Fi, etc., a mobile communication module supporting telecommunication using Long-Term Evolution (LTE), the third generation (3G) and/or fifth generation (5G) of wireless mobile telecommunications technology, or the like.

The image capturing unit 208 is coupled to the processor 202, and may be embodied using a camera that is capable of capturing a digital image.

The operation interface 210 is coupled to the processor 202, and may be embodied using a mouse, a keyboard, and/or the like. In some cases, the operation interface 210 and the display 212 may be integrated in the form of a touch screen.

In use, a user may operate the operation interface 210 to initiate the method of FIG. 2.

In step 21, the processor 202 obtains an original image (e.g., the original image 1 shown in FIG. 1). In some embodiments, the original image 1 may be captured by the image capturing unit 208, or received from an external source (not shown) via the communication component 206 over a network such as the Internet. As shown in FIG. 1, the original image 1 contains an object that may be a semiconductor wafer in this embodiment and that has a defect 112.

In step 22, the processor 202 defines a foreground area 11 that is associated with the object in the original image 1, and a background area 12 that is associated with the remaining parts of the original image 1.

In step 23, the processor 202 identifies a plurality of contour points 111 that define a contour of the object. In the example of FIG. 1, the processor 202 performs binarization on the original image 1 so as to distinguish the object (i.e., the foreground area 11) from the background area 12 in the original image 1, identifies the contour of the foreground area 11, and then identifies the contour points 111 on the contour. In this example, the object has a circular shape, and the contour points 111 constitute a circumference of the object. It should be noted that the contour points 111 shown in FIG. 1 are only for exemplary purpose, and a mass (i.e., a large number) of the contour points 111 that compose the contour of the foreground area 11 may be identified in practice.

In step 24, the processor 202 obtains, for each of the plurality of contour points 111 (hereinafter referred to as "target point"), a reference contour point set that includes, on each of two sides of the target point (i.e., two sides from the perspective of the target point), at least one reference contour point which is one of the contour points 111 on the side of the target point. For example, for the contour point 111C (i.e., the target point) shown in FIG. 1, the reference contour point set may include one reference contour point 111S that is one of the contour points 111 on a left side of the target point 111C, and one reference contour point 111E that is one of the contour points 111 on a right side of the target point 111C. In some embodiments, the reference contour point set for each contour point 111 may include two reference contour points that are two of the contour points 111 immediately to the left and right of the contour point 111, respectively, or that are two of the contour points 111 respectively on the left and right sides of the contour point 111 and spaced apart from the contour point 111 by other contour points 111. In some embodiments, the reference contour point set for each contour point 111 may include a plurality of reference contour points on each side of the contour point 111.

In step 25, the processor 202 obtains a plurality of characteristic lines 4. Each of the characteristic lines 4 is a straight line defined by an end point that is obtained from the contour points 111, is associated with a corresponding reference contour point set, and is defined to have a predefined length. Further, each of the characteristic lines 4 has a predetermined width (e.g., a predetermined number of pixels).

Figure 3:
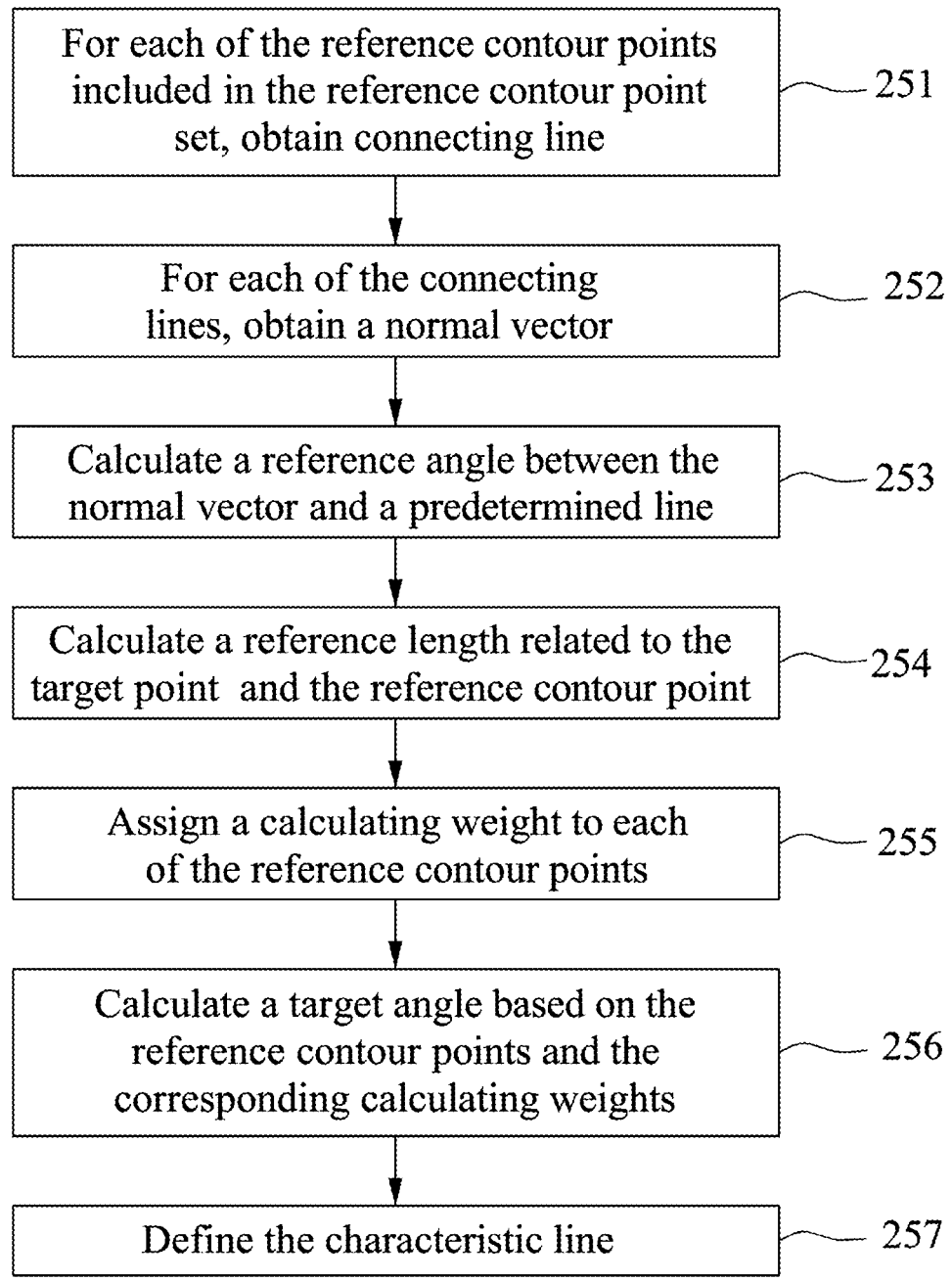
FIG. 3 is a flow chart illustrating sub-steps of a step of obtaining a characteristic line according to one embodiment of the disclosure.
Figure 4:
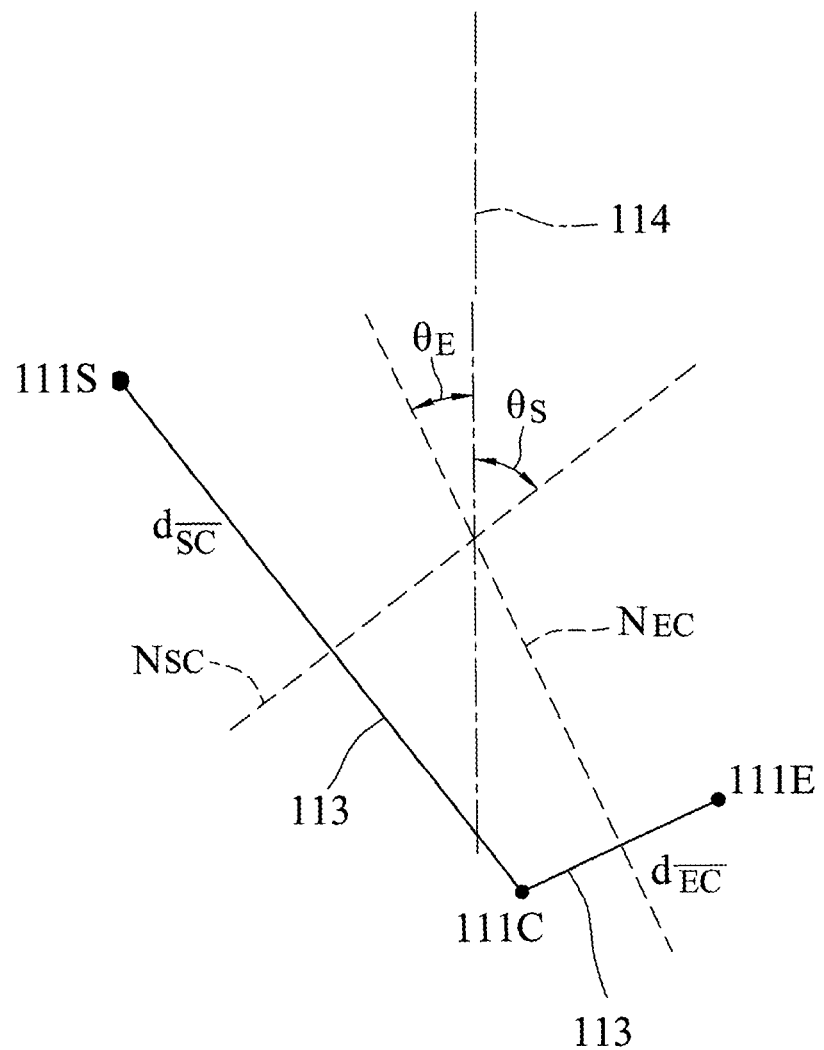
FIG. 4 is a schematic diagram illustrating relationships among a contour point, a reference contour point set, and a number of reference angles for calculating a target angle that is associated with the characteristic line.

Specifically, the operations of step 25 may be described by the following sub-steps illustrated in FIG. 3. In order to simplify the description, the following operation described below is performed with respect to one contour point (e.g., the target point 111C in FIG. 1) as shown in FIG. 4, but it should be noted that the operations may be repeated with respect to each of the plurality of the contour points 111.

In sub-step 251, for each of the reference contour points included in the reference contour point set, the processor 202 obtains a connecting line 113 defined by the target point 111C and the reference contour point. In the example of FIG. 4, two connecting lines 113 are obtained with respect to the reference contour points 111S and 111E, respectively.

In sub-step 252, for each of the connecting lines 113, the processor 202 obtains a normal vector. In the example of FIG. 4, two normal vectors (indicated by dashed lines) $N_{\overline{SC}}$, $N_{\overline{EC}}$ are obtained.

In sub-step 253, for each of the normal vectors, the processor 202 calculates a reference angle between the normal vector and a predetermined line 114. In the example of FIG. 4, the predetermined line 114 is a vertical reference line (also known as a plumb line) with respect to a horizontal line in the Cartesian coordinate system, and two reference angles $\theta_s$, $\theta_E$ are obtained.

In sub-step 254, for each of the reference contour points included in the reference contour point set (i.e., the reference contour points 111S and 111E), the processor 202 calculates a reference length related to the target point 111C and the reference contour point.

In various embodiments, the calculation of the reference lengths may be done in one of the following exemplary procedures.

In a first example, the reference lengths related to the reference contour points 111S and 111E are each a distance between the target point 111C and the corresponding reference contour point 111S/111E, and may be calculated using the following equations:

$$d_{\overline{SC}}=\sqrt{(x_C-x_S)^2+(y_C-y_S)^2}; \text{ and}$$

$$d_{\overline{EC}}=\sqrt{(x_C-x_E)^2+(y_C-y_E)^2}$$

where $d_{\overline{SC}}$ represents the reference length between the target point 111C and the reference contour point 111S, $d_{\overline{EC}}$ represents the reference length between the target point 111C and the reference contour point 111E, $(x_C,y_C)$ represents a coordinate set of the target point 111C in a Cartesian coordinate system, $(x_S,y_S)$ represents a coordinate set of the reference contour point 111S in the Cartesian coordinate system, $(x_E,y_E)$ represents a coordinate set of the reference contour point 111E in the Cartesian coordinate system.

In a second example, the reference lengths may be calculated using the following equations:

$$d_{\overline{SC}}=|x_C-x_S|+|y_C-y_S|; \text{ and}$$

$$d_{\overline{EC}}=|x_C-x_E|+|y_C-y_E|.$$

In a third example, the reference lengths may be calculated using the following equations:

$$d_{\overline{SC}}=\max(|x_C-x_S|,|y_C-y_S|); \text{ and}$$

$$d_{\overline{EC}}=\max(|x_C-x_{E'}|,|y_C-y_{E'}|).$$

It should be noted that in the case that the reference contour points 111S and 111E are immediately adjacent to the target point 111C, one of the foregoing first to third examples is to be used to calculate the reference lengths.

In a fourth example, when one or more of the reference contour points (e.g., the reference contour point 111S) is not immediately adjacent to the target point 111C (that is, other contour points are present between the target point 111C and the reference contour point 111S), the reference length related the target point 111C and the reference contour point 111S may be obtained by calculating a number of partial lengths each related to two adjacent contour points among the target point 11C and the reference contour point 11S and those contour points that are between the target point 111C and the reference contour point 111S, and then summing the partial lengths to obtain the reference length related to the target point 111C and the reference contour point 111S as a summation of the partial lengths.

Figure 5:
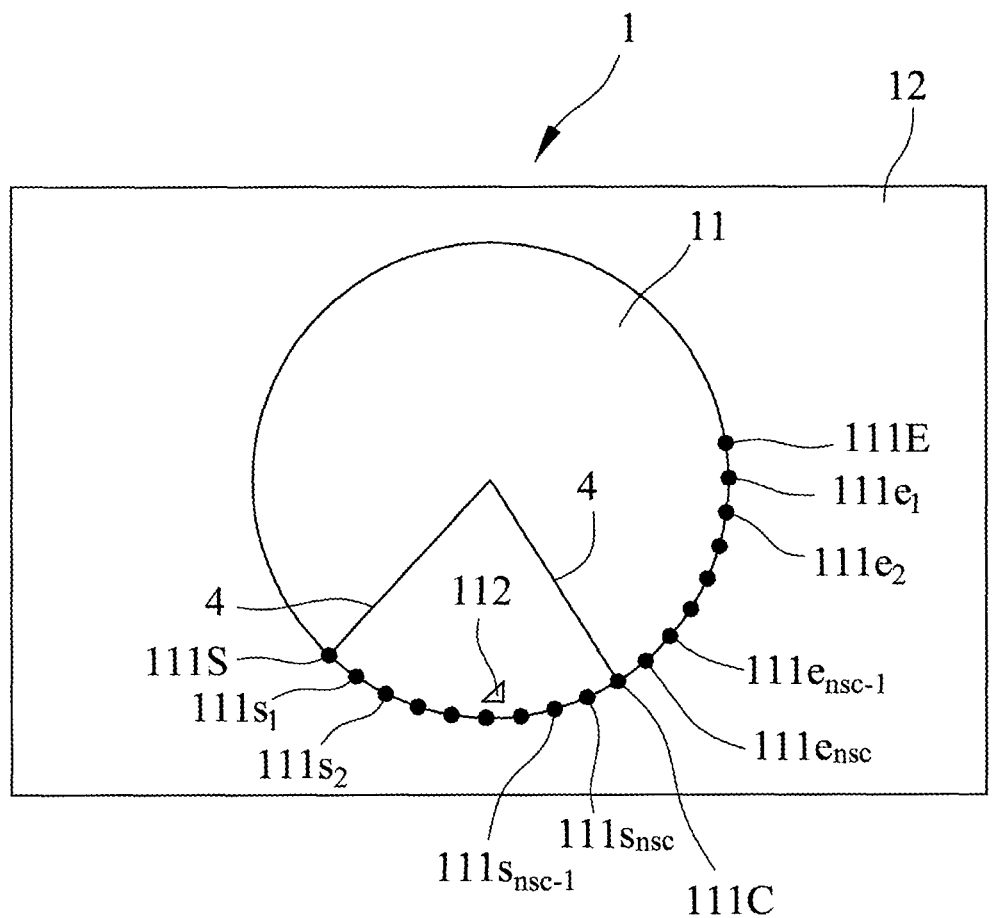
FIG. 5 is a schematic diagram illustrating one exemplary way to calculate a reference length related to a target point and each of a number of reference contour points included in a reference contour point set.

Specifically, as shown in FIG. 5, a number of exemplary contour points are present between the target point 111C and the reference contour point 111S, and are designated as $111s_1, 111s_2, \ldots, 111s_{nsc-1}, 111s_{nsc}$. Similarly, a number of exemplary contour points are present between the target point 111C and the reference contour point 111E, and are designated as $111e_1, 111e_2, \ldots, 111e_{nsc-1}, 111e_{nsc}$.

As such, the partial lengths related to the target point 111C and the reference contour point 111S may be designated as $$d_{\overline{Ss_1}}, d_{\overline{s_1s_2}}, \ldots, d_{\overline{s_{nsc-1}s_{nsc}}}, d_{\overline{s_{nsc}C}},$$

which represent the partial length related to the contour points 111S and $111s_1$, the partial length related to the contour points $111s_1$ and $111s_2, \ldots$, the partial length related to the contour points $111s_{nsc-1}$ and $111s_{nsc}$, and the partial length related to the contour point $111s_{nsc}$ and the target point 111C, respectively.

The partial lengths related to the target point 111C and the reference contour point 111E may be designated as $$d_{\overline{Ee_1}}, d_{\overline{e_1e_2}}, \ldots, d_{\overline{e_{nec-1}e_{nec}}}, d_{\overline{e_{nec}C}},$$

which represent the partial length related to the contour points 111E and $111e_1$, the partial length related to the contour points $111e_1$ and $111e_2, \ldots$, the partial length related to the contour points $111e_{nec-1}$ and $111e_{nec}$, and the partial length related to the contour point $111e_{nec}$ and the target point 111C.

Each of the partial lengths may be calculated using one of the first to third examples as described above, and the reference length related to the target point 111C and each of the reference contour points 111S, 111E may be calculated by summing the corresponding partial lengths.

In sub-step 255, the processor 202 assigns a calculating weight to each of the reference contour points based on the corresponding reference length. In one example, the calculating weight for each of the reference contour points may be positively related to the corresponding reference length.

In sub-step 256, the processor 202 calculates a target angle based on the reference contour points included in the reference contour point set and the corresponding calculating weights.

In sub-step 257, the processor 202 defines the characteristic line 4 as a straight line passing through the target point 111C. Specifically, an angle defined by the characteristic line 4 and the predetermined line equals the target angle.

In various embodiments, the defining of the characteristic line 4 (that is, the operations of steps 24 and 25) may be done in one of the following procedures.

In a first procedure, the processor 202 obtains the reference contour point set that includes, on each of two sides of the target point, one reference contour point in step 24. That is, in the example of FIG. 1, for the target point 111C, the reference contour point set includes one reference contour point 111S on the left side of the target point 111C and one reference contour point 111E on the right side of the target point 111C.

Afterward, in sub-step 255, the processor 202 assigns a calculating weight for each of the reference contour points 111S, 111E based on the following equations:

$$W_S = \frac{d_{\overline{EC}}}{d_{\overline{SC}} + d_{\overline{EC}}}, W_E = \frac{d_{\overline{SC}}}{d_{\overline{SC}} + d_{\overline{EC}}}$$

where $W_S$ and $W_E$ represent the calculating weights associated with the reference contour points 111S and 111E, respectively, $d_{\overline{SC}}$ represents the reference length related to the target point 111C and the reference contour point 111S, and $d_{\overline{EC}}$ represents the reference length related to the target point 111C and the reference contour point 111E.

Afterward, in sub-step 256, the processor 202 calculates the target angle $\theta_C$ based on the following equation:

$$\theta_C = W_S\theta_S + W_E\theta_E.$$

In a second procedure, the processor 202 obtains, on each of two sides of the target point, one reference contour point that is immediately adjacent to the target point in step 24. Afterward, in sub-step 254, the processor 202 calculates the reference length related to the target point and each one of the reference contour points using the equations mentioned in the third example above. The calculating weights and the target angle are calculated in a manner similar to the first procedure.

In a third procedure, the processor 202 obtains a reference contour point set that includes a number $N_L$ of reference contour points on one of two sides of the target point 111C, and a number $N_R$ of reference contour points on the other one of two sides of the target point 111C.

Figure 6:
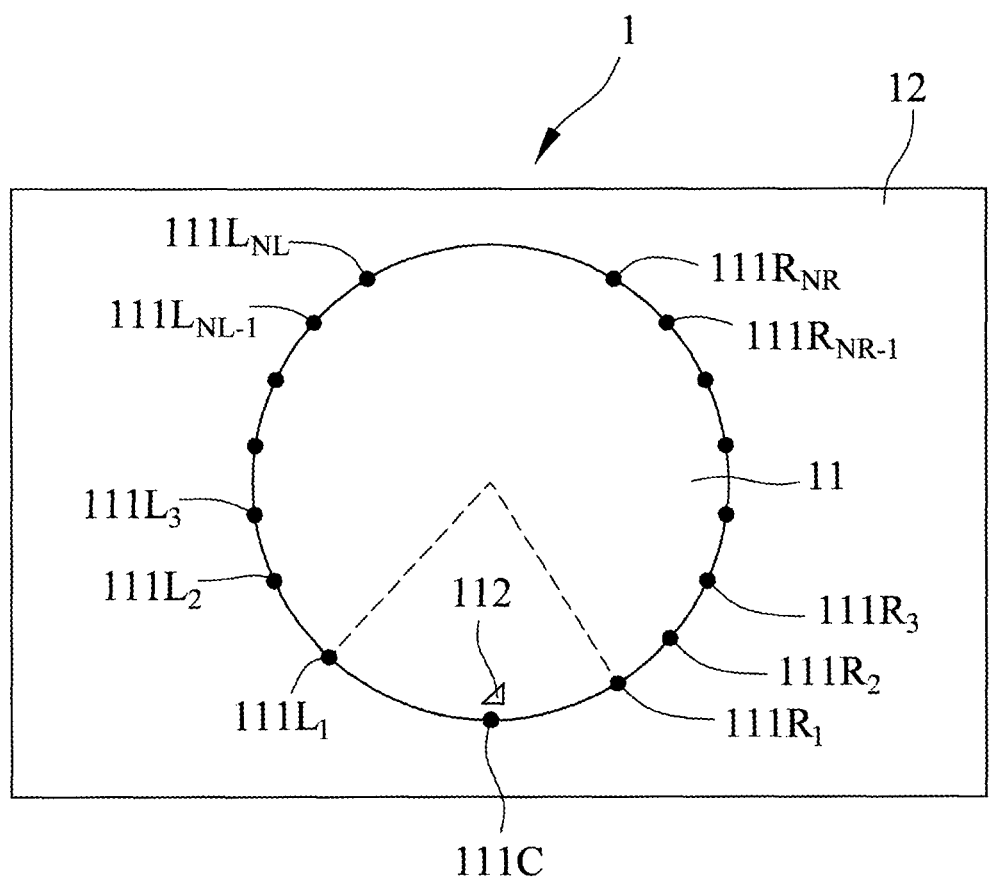
FIG. 6 is a schematic diagram illustrating one exemplary way to define a characteristic line using a number of reference contour points included in a reference contour point set.

As shown in FIG. 6, the number $N_L$ of reference contour points on the left side of the target point 111C are labeled as $111_{L1}$, $111_{L2}$, $111_{L3}$, ..., $111_{LNL-1}$, $111_{LNL}$. The number $N_R$ of reference contour points on the right side of the target point 111C are labeled as $111_{R1}$, $111_{R2}$, $111_{R3}$, ... $111_{RNR-1}$, $111_{RNR}$.

Then, in sub-step 256, the processor 202 calculates the target angle $\theta_C$ using the following equation:

$$\theta_C = stW_{L_1}\theta_{L_1} + stW_{L_2}\theta_{L_2} + \ldots + stW_{LNL-1}\theta_{LNL-1} + stW_{LNL}\theta_{LNL} + stW_{R_1}\theta_{R_1} + stW_{R_2}\theta_{R_2} + \ldots + stW_{RNR-1}\theta_{RNR-1} + stW_{RNR}\theta_{RNR}$$

where $stW_{L_n}$ represents the calculating weight associated with an $n^{th}$ one of the reference contour points on the left side, and $stW_{R_m}$ represents the calculating weight associated with an $m^{th}$ one of the reference contour points on the right side, n=1, 2, ... NL−1, and NL, and m=1, 2, ... NR−1, and NR.

For example, the calculating weights for a first one of the reference contour points on the left side and a first one of the reference contour points on the right side are calculated using the following equations $$stW_{L_1} = \frac{W_{L_1}}{W_{Sum}}, stW_{R_1} = \frac{W_{R_1}}{W_{Sum}}$$

where $W_{L_1}$ represents a length weight associated with the reference length of the first one of the reference contour points on the left side, $W_{R_1}$ represents a length weight associated with the reference length of the first one of the reference contour points on the right side, and $W_{Sum}$ represents a summation of the length weights for the reference lengths of all of the reference contour points. In this procedure, generally, each of the calculating weights for the reference contour points on the left and right sides may be calculated using the following equations:

$$W_{L_N} = \frac{d_{Sum}}{d_{L_N}}, W_{R_N} = \frac{d_{Sum}}{d_{R_N}}$$

where $W_{L_N}$ represents a length weight associated with the reference length of an $N^{th}$ one of the reference contour points on the left side, $W_{R_N}$ represents a length weight associated with the reference length of an $N^{th}$ one of the reference contour points on the right side, and $d_{Sum}$ represents a summation of the reference lengths of all of the reference contour points.

In this procedure, $\theta_{L_N}$ represents a reference angle associated with an $n^{th}$ one of the reference contour points on the left side (i.e., the angle defined by the normal vector of the connecting line between the $n^{th}$ one of the reference contour points on the left side and the target point 111C), and $\theta_{R_m}$ represents a reference angle associated with an $m^{th}$ one of the reference contour points on the right side (i.e., the angle defined by the normal vector of the connecting line between the $m^{th}$ one of the reference contour points on the right side and the target point 111C).

In a fourth procedure, the processor 202 obtains a reference contour point set that includes a number $N_L$ of reference contour points on one of two sides of the target point 111C, and a number $N_R$ of reference contour points on the other one of the two sides of the target point 111C. Specifically, in this procedure, the number $N_L$ is equal to the number $N_R$, and is an even number greater than 2. The calculating weights and the target angle are calculated in a manner similar to the third procedure.

Using the above procedures, the processor 202 is programmed to obtain the characteristic lines 4. It is noted that in this embodiment, each of the characteristic lines 4 has the corresponding one of the contour points 111 (i.e., the target point) serving as the end point, and the pre-defined length of each of the characteristic lines 4 is pre-defined to be not less than a greatest distance among distances each between a centroid of the object and a corresponding one of the contour points. In the case that the object has a circular shape, the greatest distance may be a radius of the object. In some cases, the lengths of the characteristic lines 4 may be defined to have a uniform length.

In step 26, the processor 202 obtains, for each of the characteristic lines 4, a plurality of pixel value sets that correspond respectively with those of the pixels on the original image 1 that constitute the characteristic line 4.

Figure 7:
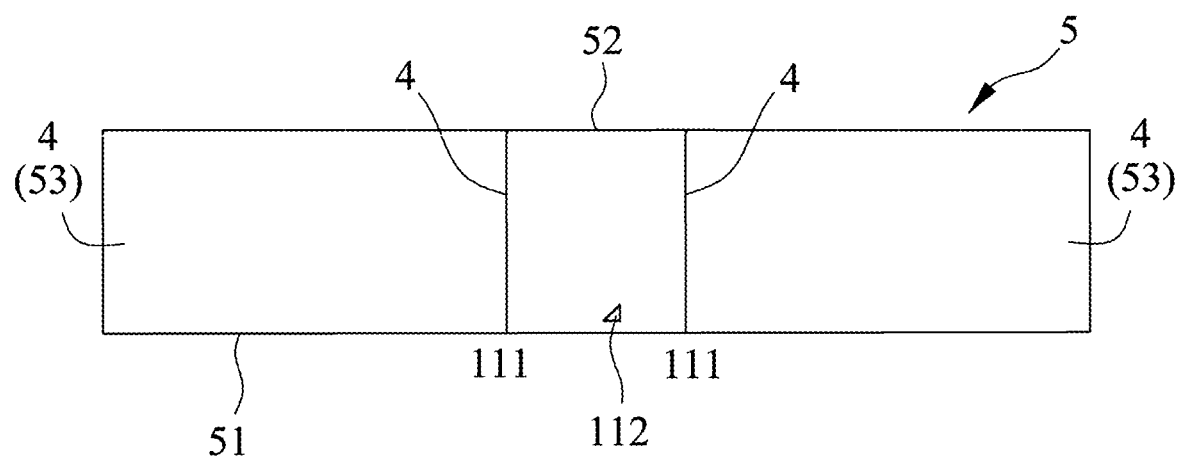
FIG. 7 is a schematic diagram illustrating a reconstructed image obtained by reconstructing the original image of FIG. 1 according to one embodiment of the disclosure.

In step 27, the processor 202 constructs a reconstructed image 5 (see FIG. 7) based on pixel value sets of the characteristic lines 4 obtained in step 26. Specifically, as shown in FIG. 7, the processor 202 rearranges the characteristic lines 4 by aligning the end points (i.e., the contour points 111) on one side to form a straight edge 51 and making the characteristic lines 4 adjoin each other side by side, so as to construct the reconstructed image 5 (only four characteristic lines 4 that are spaced apart from each other are depicted in Figure for illustration purposes). Specifically, the reconstructed image 5 is constituted by the pixel value sets of each of the characteristic lines 4, and is defined by the straight edge 51, an opposite edge 52 that is opposite to the straight edge 51 and that is formed by the other end point of each of the characteristic lines 4, and two of the characteristic lines 4 that are arranged furthest to the sides and that serve as two perpendicular edges 53. It is noted that, in some embodiments, the reconstructed image 5 has a rectangular shape since the characteristic lines 4 have a uniform length.

Afterward, the processor 202 may control the display 212 to display the reconstructed image 5, enabling the user to inspect the reconstructed image 5 to locate the defect 112. Once the defect 112 is found, the user may operate the operation interface 210 to click on the defect 112 on the reconstructed image 5, and the processor 202, in response to the user operation of clicking, controls the display 212 to display and enlarge a part of the original image 1 on which the defect 112 is located.

Figure 8:
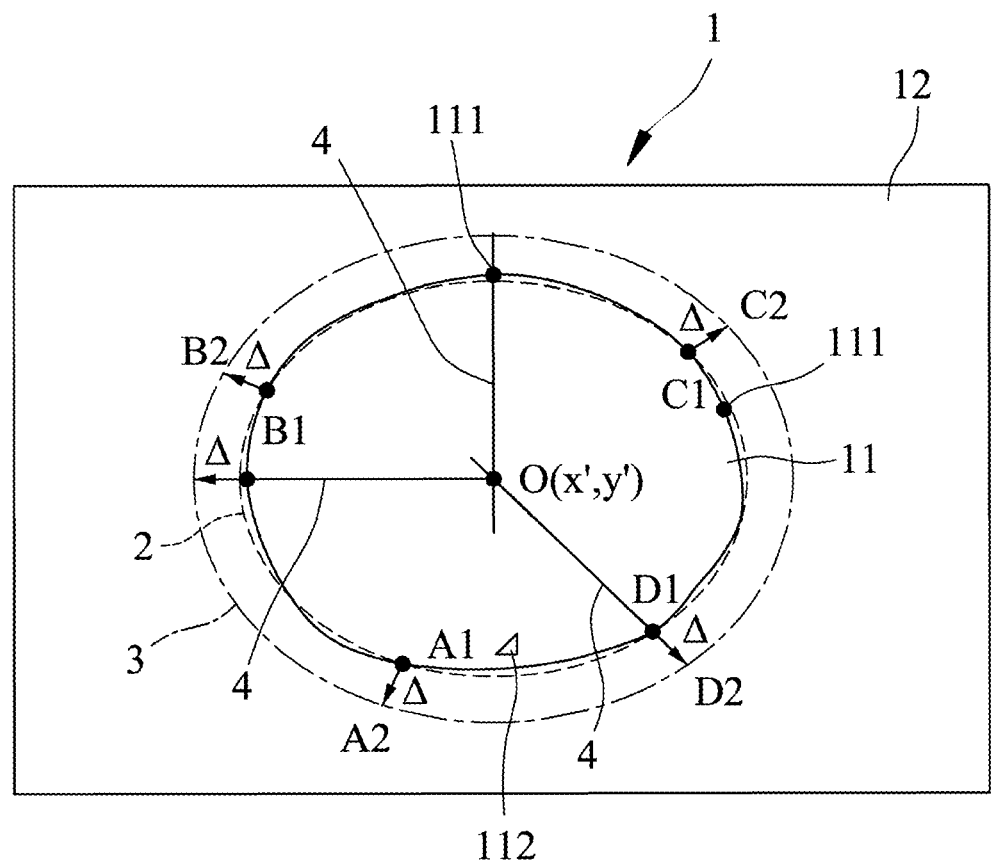
FIG. 8 is a schematic diagram illustrating another original image that contains an approximately elliptical object and that is being processed according to one embodiment of the disclosure.
Figure 9:
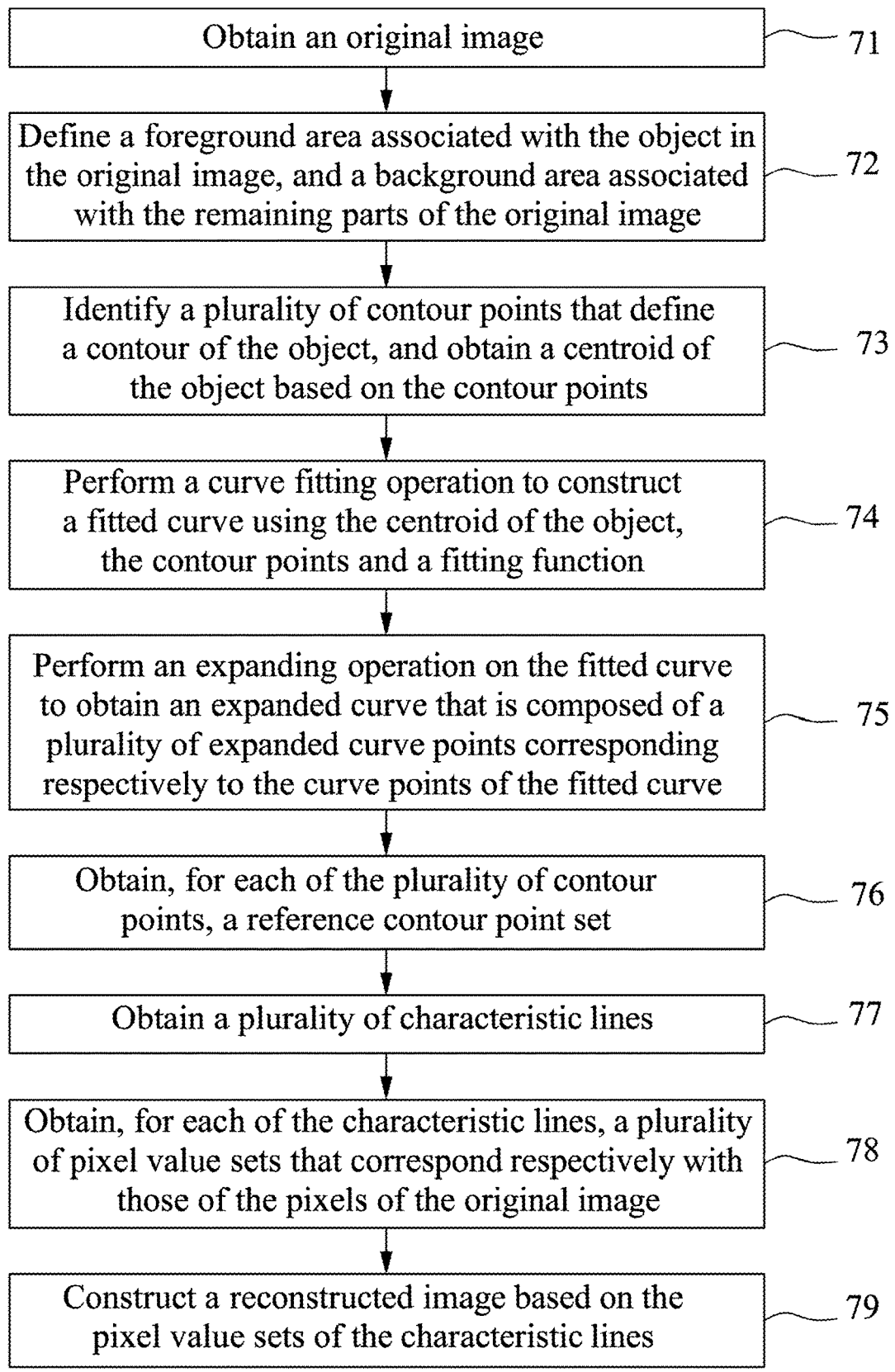
FIG. 9 is a flow chart illustrating steps of a method for reconstructing the original image according to one embodiment of the disclosure.

FIG. 9 is a flow chart illustrating steps of a method for reconstructing an original image (e.g., the original image 1 shown in FIG. 8) according to one embodiment of the disclosure. In this embodiment, the object may be a semiconductor wafer having an approximately elliptical shape, as shown in FIG. 8. The object has a defect 112.

In step 71, the processor 202 obtains an original image (e.g., the original image 1 shown in FIG. 8). In some embodiments, the original image 1 may be captured by the image capturing unit 208, or received from an external source via the communication component 206 over a network such as the Internet. As shown in FIG. 8, the original image 1 contains an object that may be a semiconductor wafer in this embodiment, and that has a defect 112.

In step 72, the processor 202 defines a foreground area 11 that is associated with the object in the original image 1, and a background area 12 that is associated with the remaining parts of the original image 1.

In step 73, the processor 202 identifies a plurality of contour points 111 that define a contour of the object, and obtains a centroid of the object (O) based on the contour points 111. In the example of FIG. 8, the processor 202 performs binarization on the original image 1 so as to distinguish the object (i.e., the foreground area 11) from the background area 12 in the original image 1, identifies the contour of the foreground area 11, and then identifies the contour points 111 on the contour. In this example, the object has a shape that is close to an ellipse, the contour points 111 constitute a circumference of the object. Similar to the above, the contour points 111 shown in FIG. 8 are only for exemplary purpose, and a mass of the contour points 111 that compose the contour of the foreground area 11 may be identified.

In step 74, the processor 202 performs a curve fitting operation to construct a fitted curve 2 (indicated by a dashed line in FIG. 8) using the centroid of the object (O), the contour points 111 and a fitting function. The fitted curve 2 is composed of a plurality of curve points. In use, the operations of step 74 may be implemented by the processor 202 executing commercially available statistical software applications.

Taking the approximately elliptical object shown in FIG. 8 as an example, the fitting function is an ellipse function expressing a standard ellipse, and the fitted curve 2 will be elliptical. The fitting function may be expressed by the following equation:

$$\frac{(x-x')^2}{m^2} + \frac{(y-y')^2}{n^2} = 1$$

where (x,y) is a set of variables that represent the contour points, (x',y') represents a coordinate of the centroid of the object (O), m represents a width of the fitted curve 2 (also known as a semi-major axis), and n represents a height of the fitted curve 2 (also known as a semi-minor axis).

It is noted that with the fitting function, the processor 202 is configured to perform the curve fitting operation with the centroid of the object (O) and at least four contour points 111 (labeled A1, B1, C1 and D1 on FIG. 8) as data points. As a result, the four contour points (A1, B1, C1, D1) are included in the curve points of the fitted curve 2.

In step 75, the processor 202 performs an expanding operation on the fitted curve 2 to obtain an expanded curve 3 that is composed of a plurality of expanded curve points corresponding respectively to the curve points of the fitted curve 2. Specifically, each of the expanded curve points is a point radially spaced apart from the corresponding one of the curve points in a direction away from the centroid of the object (O) by a predetermined expanding distance (Δ). The predetermined expanding distance (Δ) may be, for example, one millimeter. In this manner, four expanded curve points (labeled A2, B2, C2 and D2 on FIG. 8) on the expanded curve 3 are obtained from the four curve points (A1, B1, C1 and D1) of the fitted curve 2. In practice, a mass of expanded curve points will be obtained and correspond respectively to all of the curve points of the fitted curve 2 in this embodiment.

It is noted that in this embodiment, the object is not in a typical elliptical shape, and there may be some irregularities on the edge (indicated by the solid line in FIG. 8). In such a case, the fitted curve 2 may not contain all parts of the object. Therefore, the expanding operation is additionally performed to ensure that the resulting expanded curve 3 contains the entirety of the object.

In step 76, the processor 202 obtains, for each of the plurality of contour points 111 (i.e., a target point 111), a reference contour point set that includes, on each of two sides of the target point 111, at least one reference contour point which is one of the contour points 111 on the side of the target point. Step 76 of this embodiment is similar to the above-mentioned step 24 (see FIG. 2).

In step 77, the processor 202 obtains a plurality of characteristic lines 4. Each of the characteristic lines 4 is a straight line defined by an end point that is obtained from the contour points, and is defined to have a pre-defined length. Further, each of the characteristic lines 4 has a predetermined width (e.g., a predetermined number of pixels). It is noted that in this embodiment, the end point of each of the characteristic lines 4 is a corresponding one of the expanded curve points, and FIG. 8 shows four exemplary characteristic lines 4 defined by the expanded curve points (A2, B2, C2 and D2), respectively.

It is noted that the operations of steps 76 and 77 (i.e., obtaining the reference contour point set and subsequently the character lines 4) may be performed in a manner similar to the previous embodiment. It is noted that, in this embodiment, each of the characteristic lines 4 has the pre-defined length that is not less than a greatest distance among distances each between the centroid of the object (O) and a corresponding one of the contour points (i.e., a length of the semi-major axis). In some embodiments, each of the characteristic lines 4 has a user-defined length. For example, in the case that the defect 112 is a residue of edge bead removal (EBR), a location of the defect 112 typically is close to an edge of the semiconductor wafer, and a distance from the location of the defect 112 to the edge of the semiconductor wafer may be smaller than 7 millimeters. As a result, the user-defined length may be set at 7 millimeters.

It is noted that, since the user-defined length is significantly smaller than the dimensions of the object (typically inches) in all directions, a size of the reconstructed image 5 is significantly smaller than the original image 1. In this manner, the inspection of the defect 112 may be performed with relatively more ease.

In some cases, each of the characteristic lines 4 has a pre-defined length that is slightly larger than the predetermined expanding distance (Δ). In such cases, each of the characteristic lines 4 passes through the contour of the object composed of the contour points 111, and the resulting reconstructed image 5 contains an edge of the object, allowing the user to inspect whether a defect occurs on the edge of the object.

In some cases, the characteristic lines 4 have a uniform length. In step 78, the processor 202 obtains, for each of the characteristic lines 4, a plurality of pixel value sets that correspond respectively with those of the pixels on the original image 1 that constitute the characteristic line 4.

Figure 10:
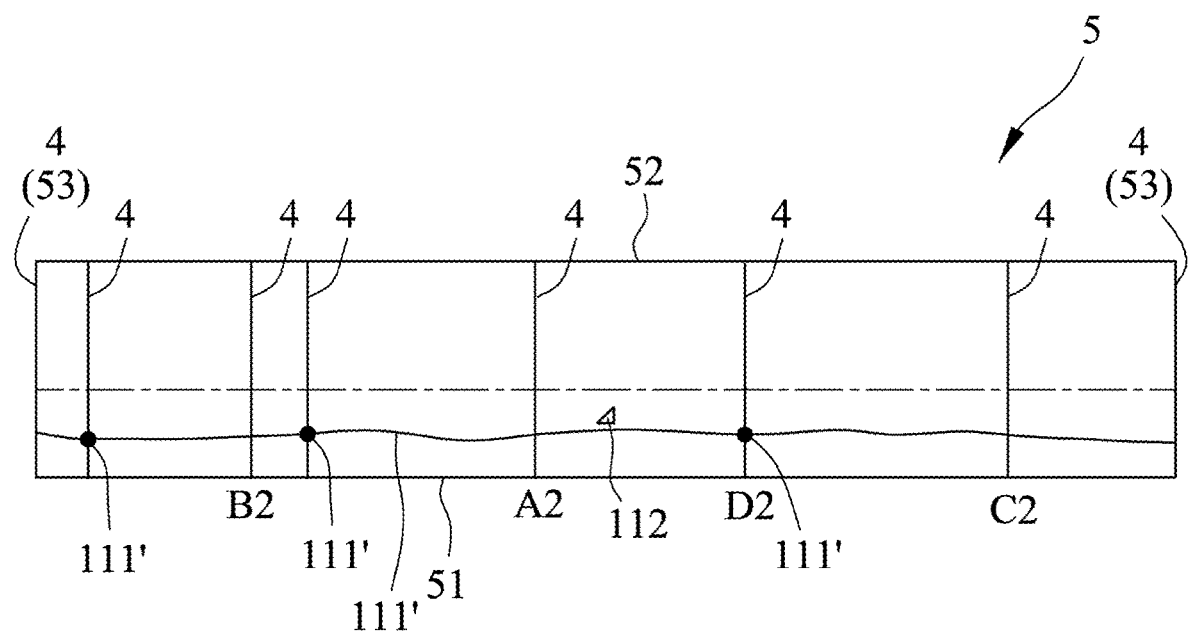
FIG. 10 is a schematic diagram illustrating a reconstructed image obtained by reconstructing the original image of FIG. 8 according to one embodiment of the disclosure.

In step 79, the processor 202 constructs a reconstructed image 5 (see FIG. 10) based on the pixel value sets of the characteristic lines 4 obtained in step 78. Specifically, as shown in FIG. 10, the processor 202 rearranges the characteristic lines 4 by aligning the end points (i.e., the expanded curve points) on one side to form a straight edge 51 and making the characteristic lines 4 adjoin each other side by side, so as to construct the reconstructed image 5. Specifically, the reconstructed image 5 is constituted by the pixel value sets of each of the characteristic lines 4, and is defined by the straight edge 51, an opposite edge 52 that is opposite to the straight edge 51 and that is formed by the other end point of each the characteristic lines 4, and two characteristic lines 4 that are arranged furthest to the sides and that serve as two perpendicular edges 53.

Afterward, the processor 202 may control the display 212 to display the reconstructed image 5, enabling the user to inspect the reconstructed image 5 to locate the defect 112. Once the defect 112 is found, the user may operate the operation interface 210 to click on the defect 112 on the reconstructed image 5, and the processor 202, in response to the user operation of clicking, controls the display 212 to display and enlarge a part of the original image 1 on which the defect 112 is located.

It is noted that since in this embodiment, the end points of the characteristic lines 4 are defined as the expanded curve points, the edge of the object may also be visible in the reconstructed image 5. The difference between this configuration and the previous embodiment lies in that the end points of the characteristic lines 4 are defined as the contour points 111 in the previous embodiment.

Figure 11:
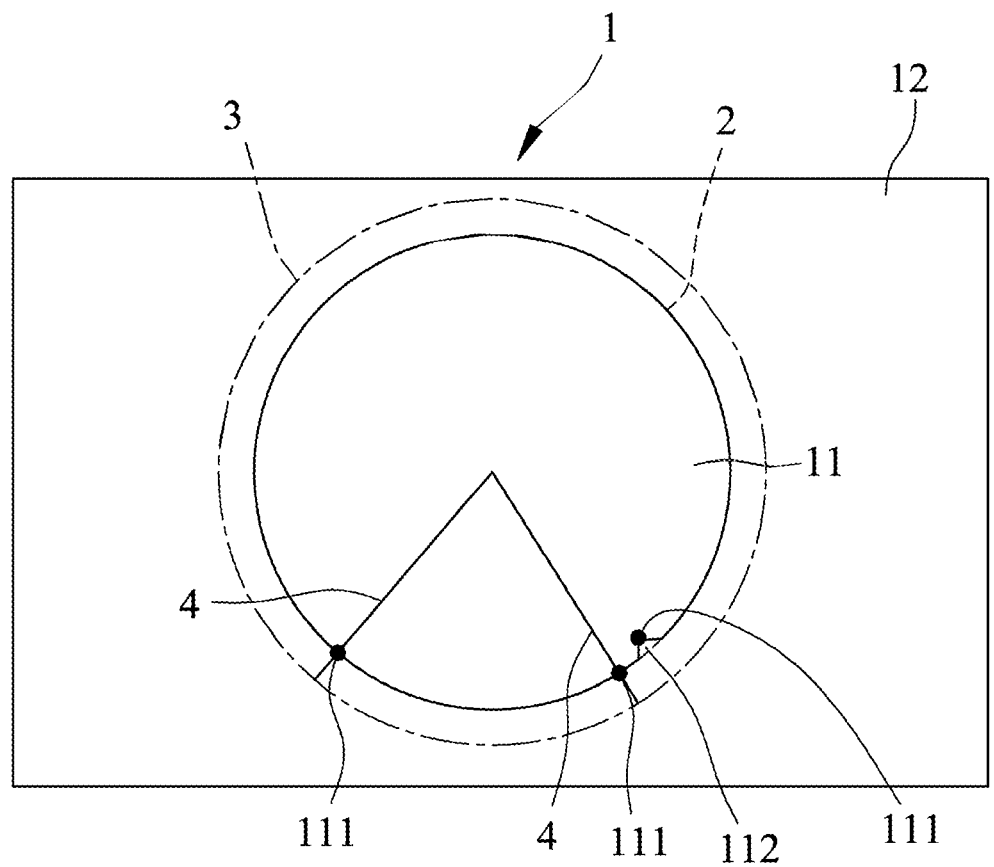
FIG. 11 is a schematic diagram illustrating another original image including a circular object with a defect at its edge and being processed according to one embodiment of the disclosure.
Figure 12:
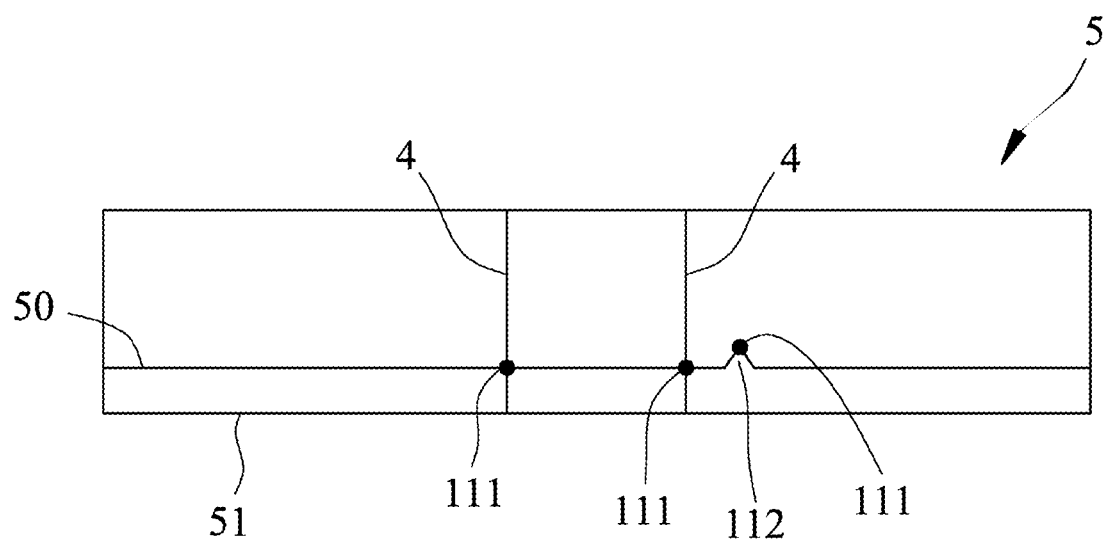
FIG. 12 is a schematic diagram illustrating a reconstructed image obtained by reconstructing the original image of FIG. 11 according to one embodiment of the disclosure.

FIG. 11 is a schematic diagram illustrating an original image 1 containing a circular object and being processed according to one embodiment of the disclosure. In this embodiment, the circular object has a defect 112 at an edge thereof. In such a case, the method of FIG. 9 may be employed to obtain the expanded curve 3, and to construct the reconstructed image 5 (see FIG. 12) using the expanded curve points. As shown in FIG. 12, the edge of the object (in the form of the contour points 111) can be visible to the user, who is enabled to easily determine whether the edge of the object has a shape of a standard circular shape by determining whether the edge on the reconstructed image 5 is a straight line.

To sum up, embodiments of the disclosure provide a method for reconstructing an original image. In different embodiments, the method includes operations to identify an object in the original image, obtain contour points of a contour of the object, obtain the characteristic lines that include the pixels of the object in the original image, and rearrange the characteristic lines so as to obtain a reconstructed image. The above operations are able to make the size of the reconstructed image smaller than that of the original image since only a portion of the original image that corresponds to the object is employed in constructing the reconstructed image.

Additionally, in the cases that the object has non-standard shapes (e.g., approximate ellipse), the method further includes operations to construct a fitted curve, and to proceed to construct the reconstructed image based on the fitted curve so as to ensure that all information of the object is contained in the reconstructed image. In the case that the object has a shape that is not a strict ellipse, the method further includes operations to expand the fitted curve to obtain an expanded curve and to proceed to construct the reconstructed image based on the expanded curve so as to ensure that all information of the object is contained in the reconstructed image. Moreover, by using the expanded curve points as the end points of the characteristic lines, the resulting reconstructed image further contains a visible edge of the object, facilitating the user to determine whether a defect is present at the edge of the object.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for constructing an image, the method to be implemented using a processor of an electronic device and comprising steps of:
   a) obtaining an original image;
   b) defining a foreground area that is associated with an object in the original image;
   c) identifying a plurality of contour points that define a contour of the object;
   d) for each of the plurality of contour points, obtaining a reference contour point set that includes, on each of two sides of the contour points, at least one reference contour point which is another one of the plurality of contour points;
   e) obtaining a plurality of characteristic lines, each of the characteristic lines being defined by an end point obtained from the contour points, is associated with the corresponding reference contour point set, and has a pre-defined length and a predetermined width;
   f) obtaining, for each of the characteristic lines, a plurality of pixel value sets that correspond respectively with the a plurality of pixels on the original image that constitute the characteristic line; and
   g) rearranging the characteristic lines by aligning the end points on one side to form a straight edge and making the characteristic lines adjoin each other side by side, so as to construct a reconstructed image.

2. The method of claim 1, wherein step e) includes, for each one of the plurality of contour points, sub-steps of:
   e-1) for each of the reference contour points included in the reference contour point set that corresponds to said one of the plurality of contour point, obtaining a connecting line defined by the contour point and the reference contour point, and obtaining a reference length related to said one of the plurality of contour points and the reference contour point;
   e-2) for each of the connecting lines obtained in sub-step e-1), obtaining a normal vector;

e-3) for each of the normal vectors obtained in sub-step e-2), calculating a reference angle between the normal vector and a predetermined line;

e-4) for each of the reference contour points, assigning a calculating weight for the reference contour point based on the corresponding reference length that is related to the reference contour point and said one of the plurality of contour points;

e-5) calculating a target angle based on the reference angles related respectively to the reference contour points included in the reference contour point set and the calculating weights assigned to the reference contour points; and e-6) defining the characteristic line to pass through said one of the plurality of contour points, wherein an angle defined by the characteristic line and the predetermined line equals the target angle.

3. The method of claim 2, wherein:

step d) includes, for each one of the plurality of contour points, obtaining a reference contour point set that includes, on each of the two sides of said one of the plurality of contour points, one reference contour point;

sub-step e-4) includes assigning calculating weights for the reference contour points using the following equations $$W_S = \frac{d_{\overline{EC}}}{d_{\overline{SC}} + d_{\overline{EC}}}, W_E = \frac{d_{\overline{SC}}}{d_{\overline{SC}} + d_{\overline{EC}}},$$

where $W_S$ represents the calculating weight for one of the reference contour points and $W_E$ represents the calculating weight for the other one of the reference contour points, and $d_{\overline{SC}}$ represents the reference length of said one of the reference contour points and $d_{\overline{EC}}$ represents the reference length of said the other one of the reference contour points; and sub-step e-5) includes calculating a target angle using the following equation $$\theta_C = W_S \theta_S + W_E \theta_E,$$

where $\theta_C$ represents the target angle, $e_s$ represents the reference angle associated with said one of the reference contour points, and $\theta_E$ represents the reference angle associated with said the other one of the reference contour points.

4. The method of claim 3, wherein:

step d) includes, for each one of the plurality of contour points, obtaining, on each of the two sides of said one of the plurality of contour points, one reference contour point that is immediately adjacent to said one of the plurality of contour points;

sub-step e-1) includes calculating the reference lengths related to said one of the plurality of contour points and the reference contour points using the following equations:

$$d_{\overline{SC}} = \max(|x_C - x_S|, |y_C - y_S|),$$

$$d_{\overline{EC}} = \max(|x_C - x_E|, |y_C - y_E|)$$

where $(x_C, y_C)$ represents a coordinate set of said one of the plurality of contour points in a Cartesian coordinate system, $(x_S, y_S)$ represents a coordinate set of one of the reference contour points included in the reference contour point set in the Cartesian coordinate system, and $(x_E, y_E)$ represents a coordinate set of the other one of the reference contour points included in the reference contour point set in the Cartesian coordinate system.

5. The method of claim 2, wherein:

step d) includes, for each one of the plurality of contour points, obtaining a reference contour point set that includes a number $N_L$ of reference contour points on one of the two sides of said one of the plurality of the contour points, and a number $N_R$ of reference contour points on the other one of the two sides of said one of the plurality of the contour points;

sub-step e-5) includes calculating a target angle using the following equations:

$$\theta_C = stW_{L_1}\theta_{L_1} + stW_{L_2}\theta_{L_2} + \ldots + stW_{L_{NL-1}}\theta_{L_{NL-1}} + stW_{L_{NL}}\theta_{L_{NL}} + stW_{R_1}\theta_{R_1} + stW_{R_2}\theta_{R_2} + \ldots + stW_{R_{NR-1}}\theta_{R_{NR-1}} + stW_{R_{NR}}\theta_{R_{NR}}$$

where $\theta_C$ represents the target angle, $stW_{L_n}$ represents the calculating weight for an $n^{th}$ one of the reference contour points on one of the two sides, $stW_{R_m}$ represents the calculating weight for an $m^{th}$ one of the reference contour points on the other one of the two sides, $\theta_{L_n}$ represents the reference angle associated with an $n^{th}$ one of the reference contour points on said one of the two sides, and $\theta_{R_m}$ represents the reference angle associated with an $m^{th}$ one of the reference contour points on said the other one of the two sides, where n=1, 2, ... NL−1, and NL, and m=1, 2, ... NR−1, and NR.

6. The method of claim 5, wherein the number $N_L$ is equal to the number $N_R$, and is an even number greater than 2.

7. The method of claim 1, wherein in step e), each of the characteristic lines has the corresponding one of the contour points serving as the end point, and has a length that is not less than a greatest distances among distances each between a centroid of the object and one of the contour points.

8. The method of claim 7, wherein in step e), the characteristic lines have a uniform length.

9. The method of claim 1, further comprising, between steps c) and d):

performing a curve fitting operation to construct a fitted curve using a centroid of the object, the contour points and a fitting function, the fitted curve being composed of a plurality of curve points; and performing an expanding operation on the fitted curve to obtain an expanded curve that is composed of a plurality of expanded curve points, wherein each of the expanded curve points is a point radially spaced apart from a corresponding one of the curve points in a direction away from the centroid of the object by a predetermined expanding distance, and each of the contour points is encompassed within the expanded curve;

wherein for each of the characteristic lines, the end point is one of the expanded curve points and the characteristic line passes through a corresponding one of the curve points.

10. The method of claim 9, the object being a semiconductor wafer and having an approximately elliptical shape, wherein the fitting function is an ellipse function expressing a standard ellipse, and the fitted curve is elliptical.

11. The method of claim 1, wherein step c) includes performing binarization on the original image.

* * * * *